(12) United States Patent  (10) Patent No.: US 9,002,970 B2
Cardona et al.  (45) Date of Patent: Apr. 7, 2015

(54) REMOTE DIRECT MEMORY ACCESS SOCKET AGGREGATION

(75) Inventors: Omar Cardona, Cedar Park, TX (US); Shaival Jagdishbhai Chokshi, Round Rock, TX (US); Rakesh Sharma, Austin, TX (US); Xiaohan Qin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 13/547,979

(22) Filed: Jul. 12, 2012

(65) Prior Publication Data

US 2014/0019572 A1  Jan. 16, 2014

(51) Int. Cl.
G06F 15/167 (2006.01)
G06F 9/54 (2006.01)
H04L 29/06 (2006.01)

(52) U.S. Cl.
CPC ............. G06F 15/167 (2013.01); G06F 9/546 (2013.01); *G06F 2209/542* (2013.01); *H04L 29/06102* (2013.01)

(58) Field of Classification Search
CPC ................................................ H04L 29/06102
USPC ............................ 709/212–216; 370/249, 412
See application file for complete search history.

(56) References Cited

U.S. PATENT DOCUMENTS

| 7,283,522 | B2 | 10/2007 | Siddabathuni | |
|---|---|---|---|---|
| 7,543,023 | B2 * | 6/2009 | Gupta et al. | 709/205 |
| 7,609,663 | B2 * | 10/2009 | Neuhaus et al. | 370/312 |
| 7,636,759 | B1 | 12/2009 | Fein et al. | |
| 7,636,760 | B1 | 12/2009 | Fein et al. | |
| 7,688,838 | B1 * | 3/2010 | Aloni et al. | 370/412 |
| 7,711,788 | B2 * | 5/2010 | Lev Ran et al. | 709/213 |
| 7,735,099 | B1 | 6/2010 | Micalizzi | |
| 8,032,892 | B2 * | 10/2011 | Blocksome et al. | 719/312 |
| 2002/0169658 | A1 | 11/2002 | Adler | |
| 2003/0179712 | A1 * | 9/2003 | Kobayashi et al. | 370/249 |
| 2004/0064578 | A1 * | 4/2004 | Boucher et al. | 709/236 |
| 2004/0072703 | A1 * | 4/2004 | Burgo et al. | 508/463 |
| 2007/0162559 | A1 * | 7/2007 | Biswas et al. | 709/216 |
| 2008/0028031 | A1 | 1/2008 | Bailey et al. | |
| 2008/0294661 | A1 | 11/2008 | Garza et al. | |
| 2009/0248830 | A1 * | 10/2009 | Kodama et al. | 709/212 |

(Continued)

OTHER PUBLICATIONS

IBM; "IBM Smart Analytics System"; Published Feb. 2011.

(Continued)

*Primary Examiner* — Razu Miah
(74) *Attorney, Agent, or Firm* — Robert H. Frantz; Parashos Kalaitzis; Libby Z. Toub

(57) ABSTRACT

Byte utilization is improved in Remote Direct Memory Access (RDMA) communications by detecting a plurality of concurrent messages on a plurality of application sockets which are destined for the same application, client or computer, intercepting those messages and consolidating their payloads into larger payloads, and then transmitting those consolidated messages to the destination, thereby increasing the payload-to-overhead byte utilization of the RDMA transmissions. At the receiving end, multiplexing information is used to unpack the consolidated messages, and to put the original payloads into a plurality of messages which are then fed into the receiving sockets to the destination application, client or computer, thereby making the consolidation process transparent between the initiator and the target.

9 Claims, 6 Drawing Sheets

(56) References Cited

U.S. PATENT DOCUMENTS

| | | | | |
|---|---|---|---|---|
| 2010/0049821 | A1* | 2/2010 | Oved | 709/212 |
| 2010/0274868 | A1* | 10/2010 | Arroyo et al. | 709/212 |
| 2010/0312941 | A1* | 12/2010 | Aloni et al. | 710/310 |
| 2010/0325391 | A1* | 12/2010 | Talla | 712/31 |
| 2011/0007740 | A1 | 1/2011 | Starvik | |
| 2011/0075641 | A1 | 3/2011 | Siriwongpairat et al. | |
| 2011/0173290 | A1* | 7/2011 | Fein et al. | 709/212 |
| 2012/0096105 | A1* | 4/2012 | Oved | 709/212 |
| 2012/0307736 | A1 | 12/2012 | Tang et al. | |

OTHER PUBLICATIONS

Networkworkinggroup; "A Remote Direct Memory Access Protocol Specification"; retrieved on Jun. 10, 2012 from http://tools.ietf.org/pdf/rfc5040.pdf.

Romanow; "An Overview of RDMA over IP"; retrieved on Jun. 10, 2012 from citeseerx.ist.psu.edu/.

Wikipedia; "SCSI RDMA Protocol"; retrieved on Jun. 10, 2012 from http://en.wikipedia.org/wiki/SCSI_RDMA_Protocol.

Oracle; "What is a socket?"; retrrieved on Nov. 9, 2014 from https://docs.oracle.com/javase/tutorial/networking/sockets/definition.html.

McAllister; "Writing kernel exploits"; retrieved on Nov. 9, 2014 from http://kmcallister.github.io/.

Webopedia; "The 7 layers of the OSI Model"; retrieved on Nov. 7, 2014 from http://www.webopedia.com/quick_ref/OSI_Layers.asp.

USPTO; Examintaion Correspondence from a U.S. Appl. No. 13/740,470, filed Jan. 14, 2013 by Omar Cardona.

* cited by examiner

REMOTE DIRECT MEMORY ACCESS SOCKET AGGREGATION

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

None.

MICROFICHE APPENDIX

Not applicable.

INCORPORATION BY REFERENCE

None.

FIELD OF THE INVENTION

The invention generally relates to methods for detecting an opportunity to increase messaging efficiency in computing systems, and especially to methods for improving efficiency of Remote Direct Memory Access protocols in applications which transmit short payloads.

BACKGROUND OF INVENTION

Remote Direct Memory Access (RDMA) is a method by which an application running in a first server may directly read, write, or both read and write data in memory which resides with a second server, usually where the first and second servers are remote to each other. By mimicking the DMA functions in a processor board in which the processor is not required to move data into the processor prior to writing it to a new location, RDMA provides similar functionality between applications on servers wherein the first application (the initiator) may access data in the target memory without disturbing the processing of the target computer. One very widely supported protocol for RDMA is Request for Comments 5040 (RFC5040) of the Network Working Group of the International Engineering Task Force (IETF), the most recent version having been drafted by R. Recio, et al.

The term "initiator" is used to describe a machine, process, application or client which wishes to access data on another machine, server, or platform.

The machine, server or platform where the data actually resides is referred to as a "target". If a "read" operation is to be performed, the data flow is from the target to the initiator. If a "write" operation is to be performed, the data flow is from the initiator to the target.

Data which is being remotely read or written is carried within a payload area of the RDMA protocol. Referring to FIG. 4a, a table is reproduced from RFC5040 which shows a data transmission for RDMA implemented on Transmission Control Protocol (TCP). The table is 32 bits wide (one double word), and the height (vertical distance) indicates the length of each section or field of the message in double words. Ellipses are shown along the vertical edges of the sections for which the length is variable depending on the contents of the message. Data is transmitted serially, starting with the first bit in the upper left corner and proceeding across towards the right to the end of the first double word, then continuing to the first bit (on the left) of the second double word through to the 32nd bit of the second word, etc., until the last bit of the check value (CRC) is transmitted (bottom right corner of the diagram).

Generally speaking, there are a number of headers (TCP, MPA, DDP, and RDMA) which precede transmission of the actual data in the payload, followed by the check value (cyclic redundancy check or CRC).

While other implementations of RDMA may include control data for other protocols, FIG. 4a provides a general understanding of the nature of how the payload data is embedded within a message having a structure in which there are a number of other "overhead" fields (e.g. headers, pads, separators, etc.).

SUMMARY OF EXEMPLARY EMBODIMENTS OF THE INVENTION

Byte utilization is improved in Remote Direct Memory Access (RDMA) communications by detecting a plurality of concurrent messages on a plurality of application sockets which are destined for the same application, client or computer, intercepting those messages and consolidating their payloads into larger payloads, and then transmitting those consolidated messages to the destination, thereby increasing the payload-to-overhead byte utilization of the RDMA transmissions. At the receiving end, multiplexing information is used to unpack the consolidated messages, and to put the original payloads into a plurality of messages which are then fed into the receiving sockets to the destination application, client or computer, thereby making the consolidation process transparent between the initiator and the target.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

Figure 4A:
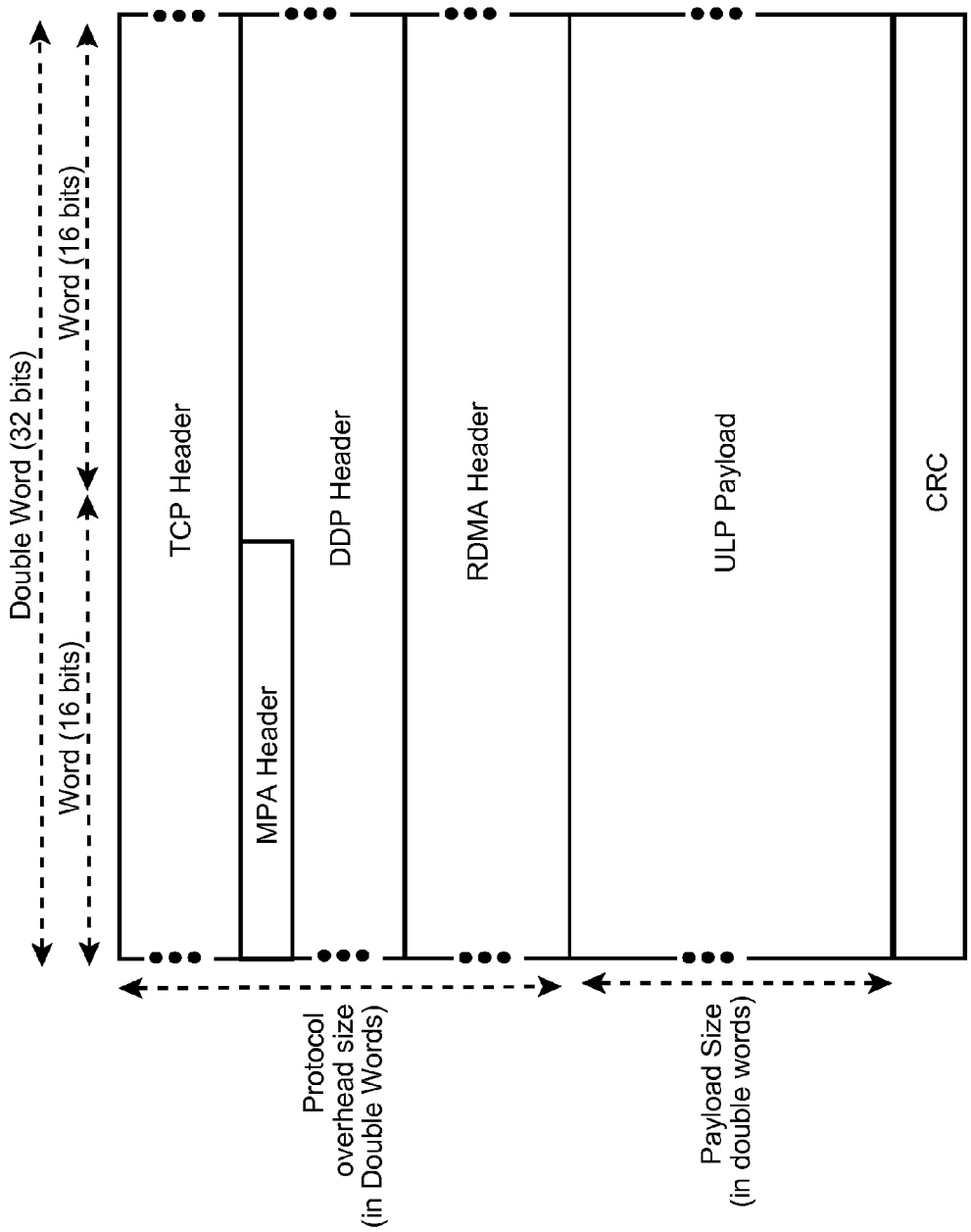
FIG. 4a shows the general structure of RDMA over TCP according to at least one open standard.
Figure 4B:
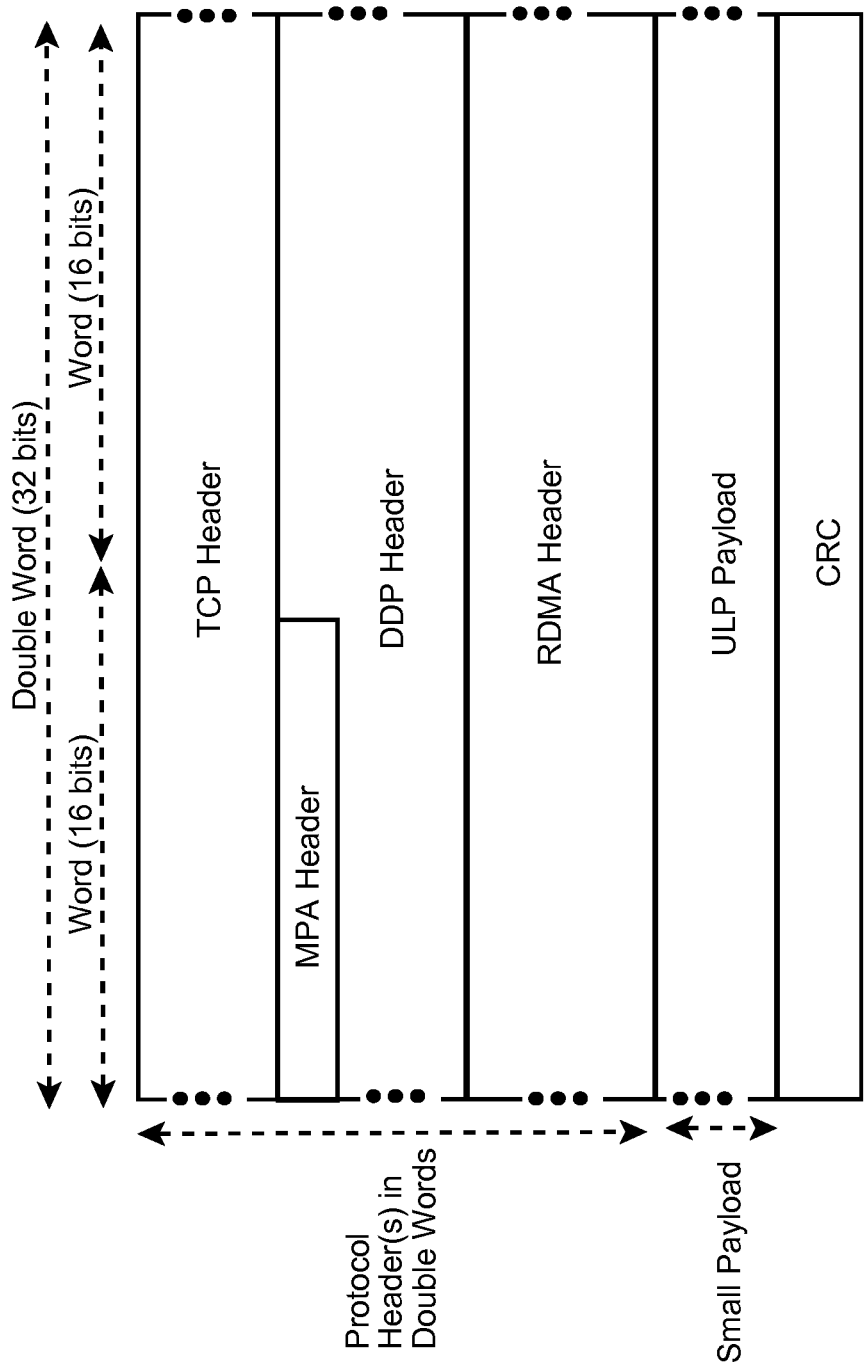
FIG. 4b illustrates the overhead-heavy scenario of RDMA over TCP when the payload contains much less data than the overhead (headers).

The inventors of the present and the related invention have recognized problems not yet recognized by those skilled in the relevant arts regarding the capacity of remote direct memory access (RDMA) to provide high performance data communications. The inventors have realized that because each of the RDMA communications transactions carries an overhead inefficiency, therefore computer applications ("applications") that exchange small size messages incur limited benefit from use of RDMA. For example, referring to FIG. 4b where a small payload size is illustrated, one may easily compare the ratio of overhead size to payload in this example to the ratio of overhead size to payload size in the example of FIG. 4a. In the example of the smaller payload, it is clear that overhead accounts for the majority of the bits transmitted, and thus the majority of the bandwidth consumed by a small payload RDMA exchange is due to overhead.

Furthermore, while Server Virtualization is a compelling technological advance in computing, especially for Data Centers because it allows higher server utilization, flexibility, dynamic infrastructure and enables improved operational economics, but use of RDMA with virtual servers is not currently possible.

IBM's™ Smart Analytics™ applications and other business analytics applications exchange a plurality of concurrent messages with other application servers, such as database servers, to complete a transaction. The application messages can range from very small (ie. 64B) to larger sizes (ie. >64K) but have a request/response characteristic for a specific transaction. Such a system, for example, typically has multiple concurrent transactions in progress to the same destination application server. Concurrency from the application is achieved via the use of multiple sockets. But, the inventors have discovered that when RDMA is used for such applications, considerably system performance overhead is incurred on a per transaction basis due to RDMA's inefficiency of handling short messages (e.g. large overhead to short-payload ratio in the RDMA protocol).

The inventors further recognized that the known solutions to this problem include modifying the application programs to utilize the communications sockets from kernel space, instead of using sockets from the user space of the operating system. The present inventors have identified at least three serious limitations to this approach:
1) this approach requires application programming changes, which is undesirable especially for pre-existing application programs;
2) this approach effectively eliminates concurrent application execution;
3) this approach cannot consolidate messages from more than one application to reduce the overhead incurred by usage of RDMA.

And, bearing in mind that RDMA does not allow application deployment in virtual servers as previously mentioned, then the use of RDMA for certain types of applications such as business analytics applications because problematic, inefficient and undesirable.

In response to recognizing these unaddressed problems in the art, the present inventors are disclosing an invention which solves both problems by making RDMA transactions more efficient even for applications which use a great number of short messages, and by making RDMA-enable applications deployable on Virtual Servers.

The problem at hand is that application server workloads can benefit from circumventing the high CPU costs of small concurrent message transactions to a common destination by a coalescing and aggregating short messages across associated application sockets at the Open Systems Interface (OSI) Session Layer (i.e. Layer 5) inside of the operating system's kernel.

Initially, the RDMA connection establishment of each socket is performed via the traditional process in which each end (initiator device and target device) of the communication session is aware of the connection. Afterward the session is established across multiple sockets (to support concurrent messaging), the OS kernel can discover via an out of band mechanism which specific application sockets are associated with a common source and common destination. The associated sockets are then re-associated with a single kernel-level RDMA connection using a single socket, in which the single connection represents an aggregation group of sockets on top of a kernel RDMA connection. We'll refer to the aggregation mechanism as Application Communication Protocol Module (ACPM) for the purposes of the present disclosure.

Because concurrent socket operations from the application programs will provide an aggregation (multiplexing) of messages to a single kernel RDMA connection, the short messages sent using RDMA are consolidated into larger messages which take benefit from larger RDMA transaction (e.g. percentage of CPU and communication bandwidth consumed by message overhead is lower for the larger messages). This results in several benefits:
1) reduced CPU costs per byte via aggregating small (unsent) messages into a larger payload message on the transmitting end of the session;
2) concurrency from application space to kernel space via context switches and copy into kernel;
3) avoids recompiling or changing to the application programming interface (API) which avoids any coding changes to existing application programs.

After an encapsulation of a message grouping to a common destination has been performed, it is clear that the destination system must be ACPM RDMA aware. On the destination side, the ACPM module unpacks (demultiplexes) and routes each shorter (original) message to the appropriate ingress socket to the destination application.

This new approach allows application deployment in virtual servers. Further, large message sizes enable efficient RDMA usage from Virtual Servers to Virtual I/O Server.

Figure 2:
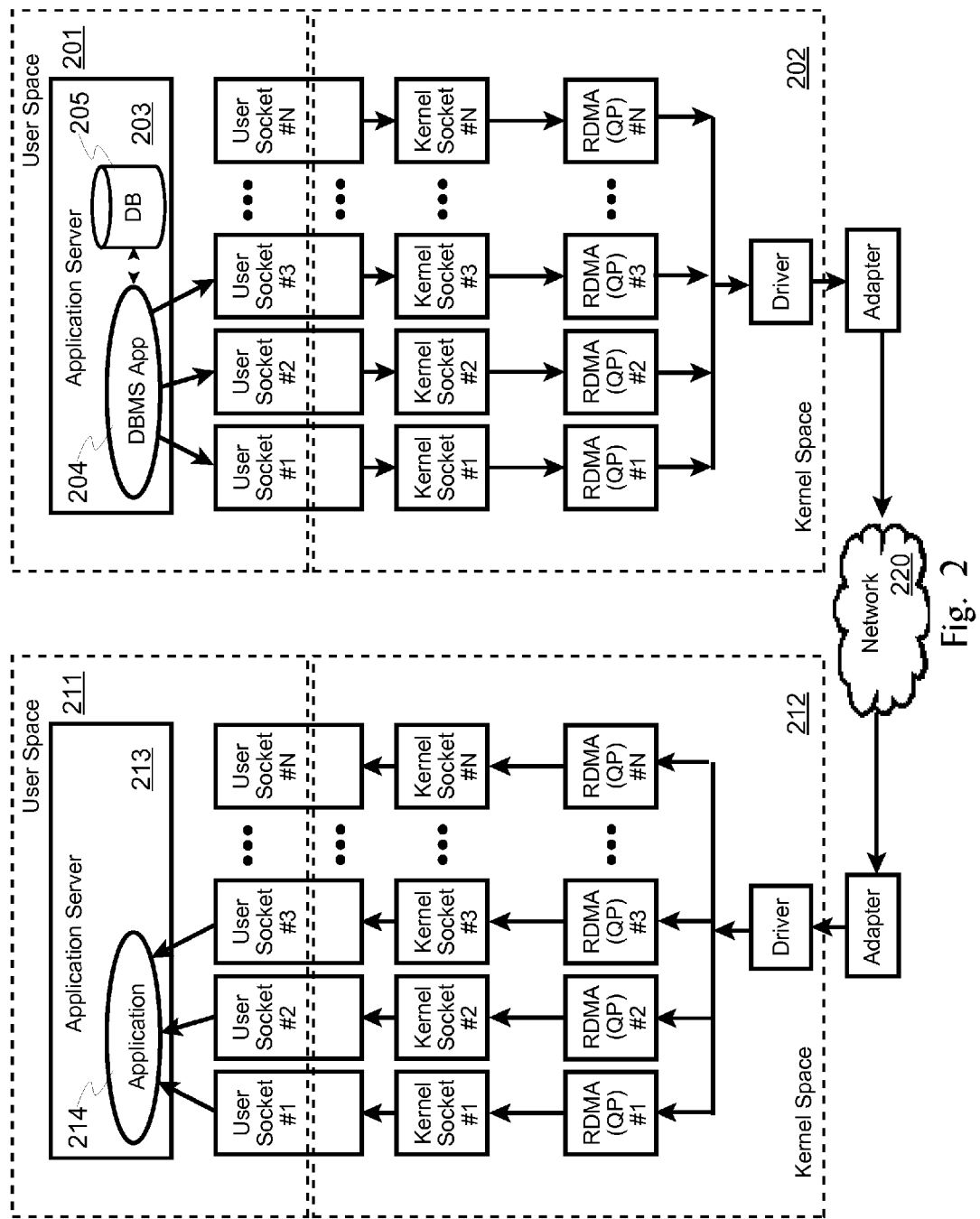
FIG. 2 shows the example of FIG. 1 without the benefit of the invention.

Turning now to FIG. 2 to illustrate the problem solved in the current state of the art, two application servers (213, 203) are shown, both of which have user spaces (211, 201) and kernel spaces (212, 202) as the terms are commonly used in UNIX, AIX™ and LINUX types of operating systems. Within each application server is running one or more application programs (204, 214), which may be communicating with each other using RDMA through a plurality of user space sockets. In this example, the initiator is the application on the left (214), and the target is a database application on the right (204, 205), and the arrows indicate a "read" operation of payload data flowing from the database (205) to the application (214). As explained in the previous paragraphs, concurrency of messaging is achieved by using several sockets simultaneously, but if the nature of the access of the database is short payloads, the message overhead associated with the RDMA protocol becomes a burdensome percentage of the overall bandwidth used.

Figure 1:
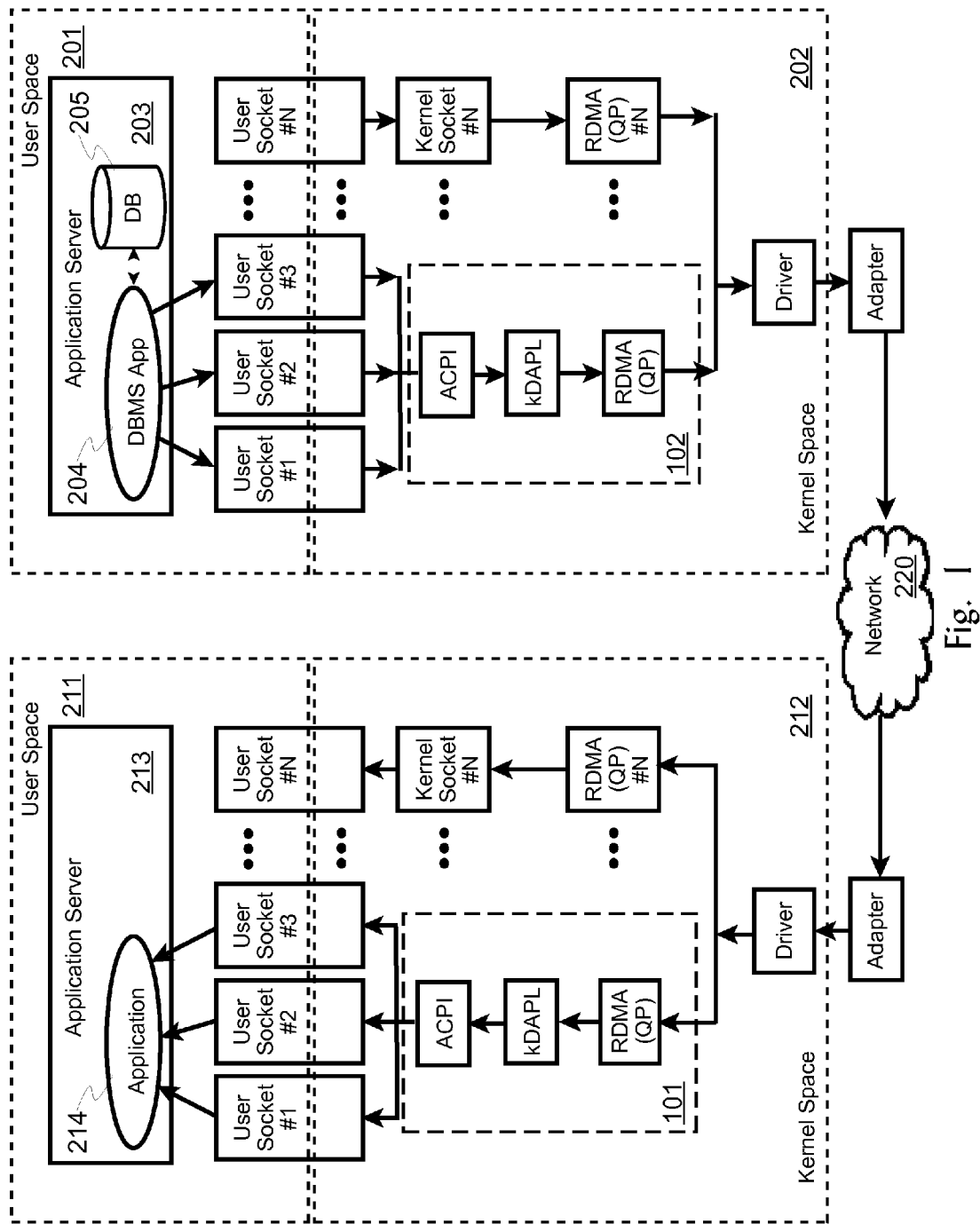
FIG. 1 illustrates an embodiment of the present invention using an example of an application accessing a remote database using RDMA and a message aggregator as disclosed.

Referring now to FIG. 1 as an illustration of at least one embodiment of the present invention, a new module ACPI is provided into the kernel space of each server platform, such as through the use of a kernel Direct Access Programming Library (kDAPL) as promulgated by the DAT Collaborative. kDAPL allows kernel-level API's to be used by new add-in functions, such as our ACPI function, to leverage and extend the socket-based connection within such an operating system.

The ACPI modules communicate to each other through an out-of-band process to detect and determine with messages flowing through multiple sockets at a given time represent a session between the two applications, such as the initiator application (214) and the target database (204, 205). Responsive to this being detected, the short-payload messages are intercepted within the kernel and aggregated (multiplexed) on the sending end into larger messages, so as to produce a larger payload-to-overhead byte usage ratio (e.g. more efficient use of the bandwidth). The larger messages can then be transmitted on fewer sockets, such as just over a single socket, to the destination. On the receiving end of the session, the larger messages are unpacked or demultiplexed into shorter messages, and routed into their original user sockets so that the receiving application may receive the shorter messages at their expected sockets normally (e.g. making the multiplexing and demultiplexing transparent to the application).

As one can see from the diagram, the aggregation and unpacking can be performed in either direction of data flow, for either a remote read or a remote write, with similar benefit.

And, the method of multiplexing and demultiplexing can take any number of forms, such as embedding within the larger payload one or more tags, words or flags which separate the original shorter messages and retain information about the original socket on which they were transmitted at the source end of the session. Such information is then used on the receiving end of the session to separate the larger payload into the shorter messages and to route the shorter messages to their appropriate destination sockets.

Figure 3:
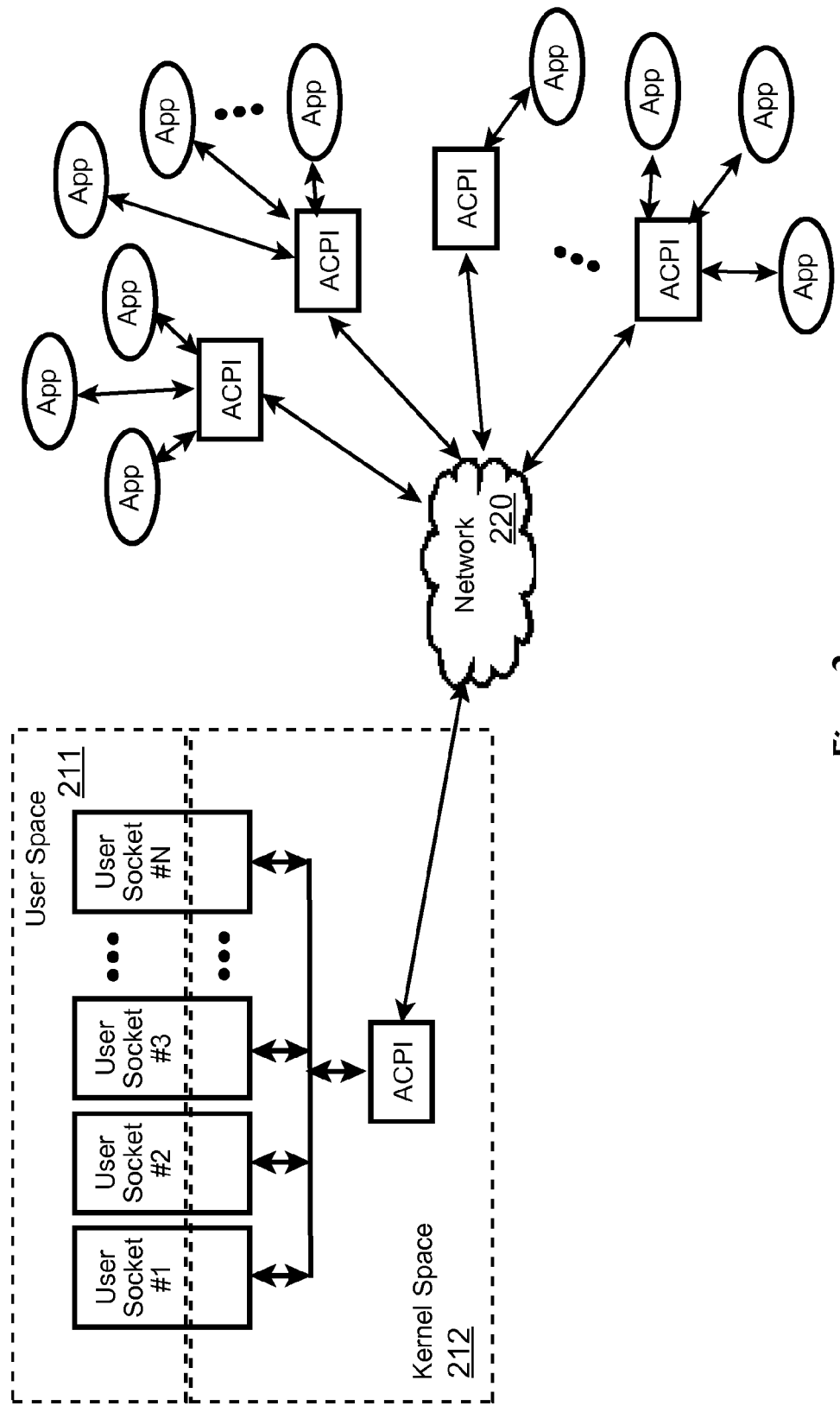
FIG. 3 depicts the out-of-band coordinating process according to the present invention.

Referring to FIG. 3, the scalability of implementations of the present invention is shown, in which a plurality of ACPI modules may communicate with each other via a network (220) to determine when multiple ports on each application server are involved in the same session between an initiator and a target, thereby triggering the aggregation and unpacking actions described in the previous paragraphs.

Suitable Computing Platform. The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 5:
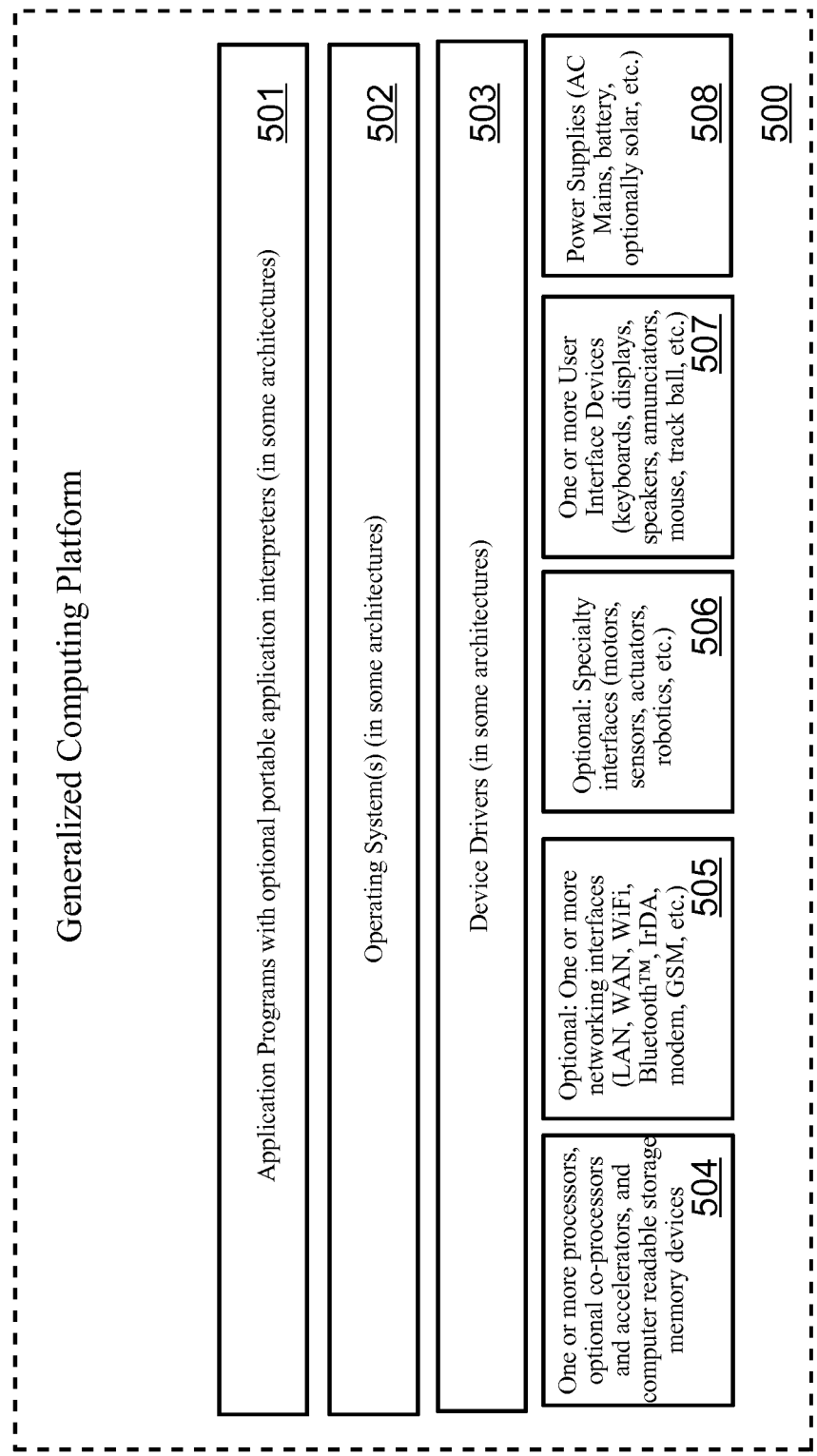
FIG. 5 sets forth a generalized computing platform suitable for realization of at least one embodiment of the present invention.

The present invention may be realized for many different processors used in many different computing platforms. FIG. 5 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

Conclusion. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A computer program product for providing remote direct memory access communication comprising:
   a tangible, computer-readable storage memory device;
   first program instructions for, at a first data processing system, intercepting a plurality of concurrent application socket messages prior to transmission a common application socket destination, each intercepted message having a payload;
   second program instructions for, still prior to transmission to the common application socket destination, aggregating the payloads of the intercepted concurrent application socket messages into one or more consolidated payloads of one or more application socket messages;

third program instructions for notifying the common application socket destination of the aggregation and multiplexing information using an out-of-band communication; and fourth program instructions for transmitting to the common application socket destination the one or more consolidated payloads in the one or more application socket messages on fewer sockets than the plurality of intercepted application socket messages, wherein a ratio of payload to protocol overhead byte utilization is increased compared to the same ratio for the plurality of intercepted messages;

wherein the program instructions for intercepting and aggregating are performed in a communications stack at a level compliant with Open Systems Interface level 5 session level; and wherein the first, second, third and fourth program instructions are stored by the tangible, computer-readable storage memory device.

2. The computer program product as set forth in claim 1 wherein the program instructions for transmitting multiplexing information comprises program instructions for embedding the multiplexing information in the one or more consolidated messages.

3. The computer program product as set forth in claim 1 wherein the destination comprises a second data processing system.

4. The computer program product as set forth in claim 1 wherein the intercepted messages are part of a remote direct memory access protocol.

5. A system for providing remote direct memory access communication comprising:

an interceptor for, at a first data processing system, intercepting by a computer a plurality of concurrent application socket messages prior to transmission a common application socket destination, each intercepted message having a payload;

an aggregator for, still prior to transmission to the common application socket destination, aggregating by a computer the payloads of the intercepted concurrent application socket messages into one or more consolidated payloads;

a notifier for notifying by a computer the common application socket destination of the aggregation and multiplexing information using an out-of-band-communication; and a transmitter for transmitting by the first data processing system to the common application socket destination the one or more consolidated payloads in the one or more application socket messages on fewer sockets than the plurality of the intercepted application socket messages, wherein a ratio of payload to protocol overhead byte utilization is increased compared to the same ratio for the plurality of intercepted messages.

6. The system as set forth in claim 5 wherein the interceptor and aggregator comprise components of an operating kernel of a computer operating system of a computer.

7. The system as set forth in claim 5 wherein the interceptor and the aggregator comprise components within in a communications stack at a level compliant with Open Systems Interface level 5 session level.

8. The system as set forth in claim 5 wherein the destination comprises a second data processing system.

9. The system as set forth in claim 5 wherein the intercepted messages comprise remote direct memory access protocol messages.

\* \* \* \* \*